United States Patent
Clemm et al.

(10) Patent No.: US 8,954,998 B1
(45) Date of Patent: *Feb. 10, 2015

(54) APPLICATION OF AN EMBEDDED INSTRUMENTATION INTERFACE DEFINITION LANGUAGE

(75) Inventors: L. Alexander Clemm, Los Gatos, CA (US); Jung Sauw Tjong, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/588,866

(22) Filed: Aug. 17, 2012

Related U.S. Application Data

(63) Continuation of application No. 12/337,528, filed on Dec. 17, 2008, now Pat. No. 8,255,932.

(51) Int. Cl.
*G06F 9/54* (2006.01)
*H04L 29/00* (2006.01)

(52) U.S. Cl.
USPC .......................................... 719/328; 709/220

(58) Field of Classification Search
CPC ................................ G06F 9/541; G06F 9/547
See application file for complete search history.

(56) References Cited

U.S. PATENT DOCUMENTS

| | | |
|---|---|---|
| 6,349,333 B1 | 2/2002 | Panikatt et al. |
| 7,310,664 B1 * | 12/2007 | Merchant et al. ............. 709/220 |
| 8,255,932 B1 | 8/2012 | Clemm et al. |
| 2005/0182843 A1 | 8/2005 | Reistad et al. |
| 2008/0043648 A1 | 2/2008 | Buga et al. |
| 2009/0070447 A1 | 3/2009 | Jubinville et al. |

OTHER PUBLICATIONS

"U.S. Appl. No. 12/337,528, Non Final Office mailed Nov. 1, 2011", 14 pgs.
"U.S. Appl. No. 12/337,528, Notice of Allowance mailed Apr. 12, 2012", 16 pgs.
"U.S. Appl. No. 12/337,528, PTO Response to Rule 312 Communication mailed Jul. 24, 2012", 2 pgs.
"U.S. Appl. No. 12/337,528 , Response filed Feb. 1, 2012 to Non Final Office Action maileed Nov. 1, 2011", 9 pgs.

* cited by examiner

*Primary Examiner* — Andy Ho
*Assistant Examiner* — Abdou Seye

(57) ABSTRACT

A system and method provides a managed resource instrumentation application on a network device to instrument a managed network device component. The managed resource instrumentation application includes an application programming interface (API) that is common to two or more management agents that are implemented on the device, the management agents being configured to process network management instructions that are in different respective protocols. The API is common to the management agents, to provide access by the management agents to the managed network device component via the common API.

17 Claims, 10 Drawing Sheets

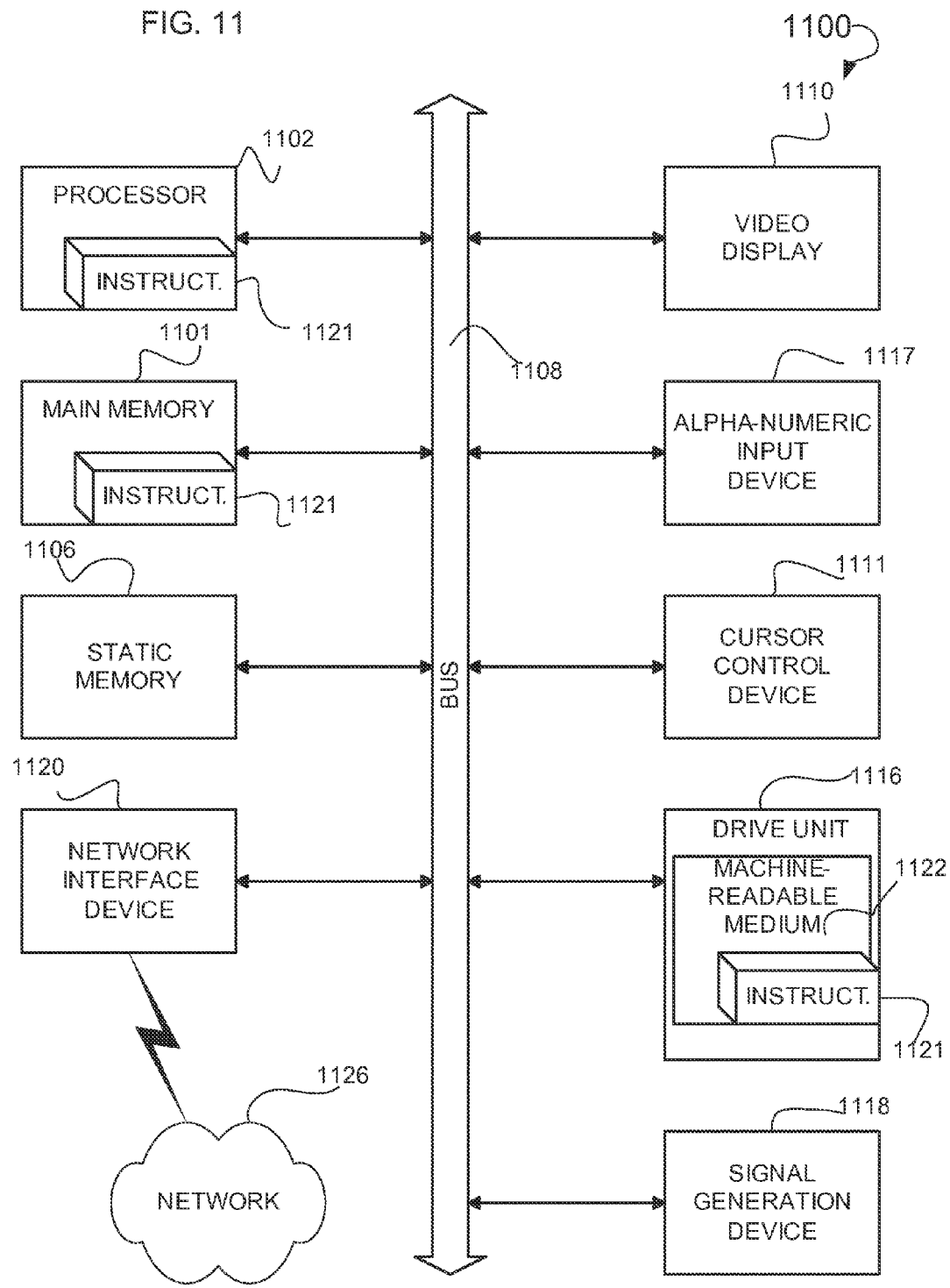

APPLICATION OF AN EMBEDDED INSTRUMENTATION INTERFACE DEFINITION LANGUAGE

CROSS-REFERENCE TO RELATED APPLICATIONS

This application claims the benefit of priority under 35 U.S.C. 120 to U.S. patent application Ser. No. 12/337,528 (issuing as U.S. Pat. No. 8,255,932 on Aug. 28, 2012), filed Dec. 17, 2008, which is incorporated herein by reference in its entirety.

FIELD

This application relates to computer implemented methods and algorithms, and in one specific example, to the implementation of a computer language.

BACKGROUND

Computer languages may be based upon grammars. Grammars may dictate how a computer program is lexically, syntactically, and semantically analyzed prior to compilation or interpretation. A computer language may be object-oriented, and may be imperative, declarative, or have some other characteristics. Using a grammar, a computer language may be written to reflect the need of particular users.

BRIEF DESCRIPTION OF DRAWINGS

The presently shown system and method is illustrated by way of example and not limitation in the figures of the accompanying drawings, in which like references indicate similar elements and in which:

FIG. 11 shows a diagrammatic representation of a machine, in accordance with an example embodiment, in the form of a computer system.

DESCRIPTION OF EXAMPLE EMBODIMENTS

Overview

In one example embodiment, a system and method are illustrated that include defining an interface that is independent of a management interface associated with a management agent. The interface is configured to instrument a network device component. Further, an API is generated from the interface. Additionally, a binding is created between the management agent and the API to implement the management interface associated with the management agent.

In the following description, for purposes of explanation, numerous specific details are set forth in order to provide a thorough understanding of an embodiment of the present invention. It may be evident, however, to one skilled the art that the present system and method may be practiced without these specific details.

Figure 1:
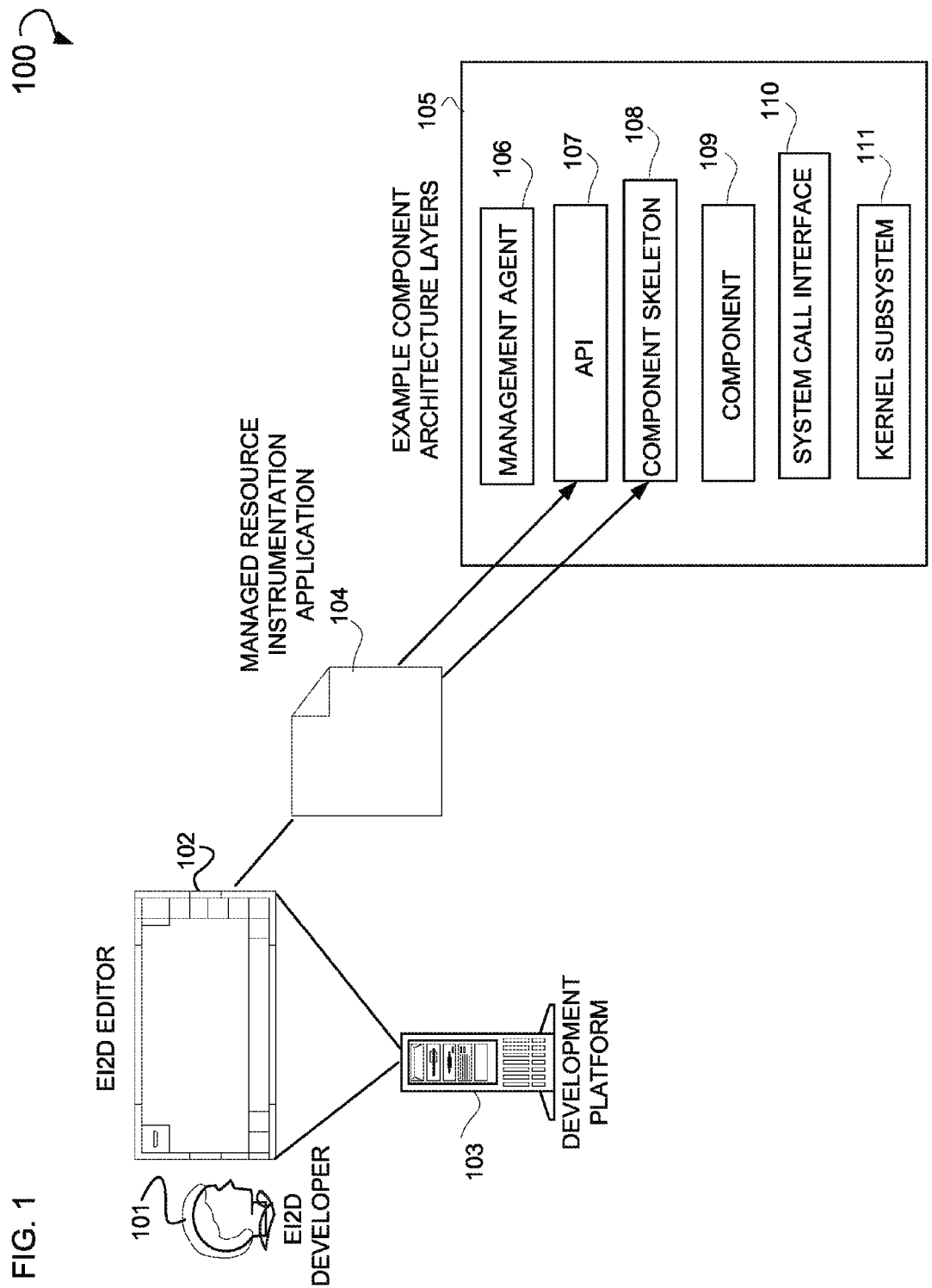
FIG. 1 is a diagram of a component architecture, according to an example embodiment, illustrating the installation of a managed resource instrumentation application.

FIG. 1 is a diagram of an example component architecture 100 illustrating the installation of a network device independent managed resource instrumentation application 104. The managed resource instrumentation application 104 is a component that is introduced into the architectural layers of a network device so as to make the network device management agent independent. The independence of the network device means that the network device is not dedicated to any single management agent. This independence is facilitated through the use of an eXtensible Markup Language (XML) based interface that can be translated, compiled, or interpreted into the managed resource instrumentation application 104. While written in a particular programming language, the managed resource instrumentation application 104 is not dedicated to the particular programming language used to implement a management agent. The interface can be translated, compiled, or interpreted into a managed instrumentation application 104 written in a language to meet the needs of a particular management agent and network device. Where a new management agent is used with a particular device, the interface can be translated, compiled, or interpreted to facilitate the use of this new management agent on the network device. As used herein, "implement" refers to the execution on a device.

Shown is an Embedded Instrumentation Interface Definition Language (EI2D) developer 101 who, using an EI2D editor 102 generates the managed resource instrumentation application 104. The managed resource instrumentation application 104 is written using the EI2D language. The EI2D editor 102 is generated by a development platform 103. The EI2D editor 102 is an Integrated Development Environment (IED) utilized by the EI2D developer 101 to write and translate, compile, or interpret an interface into the managed resource instrumentation application 104. The EI2D editor 102 may include parsing, compilation, and debugging capabilities associated with an IED. The development platform is a computer system.

In some example embodiments, the managed resource instrumentation application 104, and the components included therein, is installed in a network device 105. These components may include an API 107 and/or a component skeleton 108. The XML interface may be translated, compiled or interpreted into a managed resource instrumentation application 104 that includes one or both of these components. Further, these components may be installed as software, firmware, or hardware components. The API 107 and the component skeleton 108 may be installed as part of an operating system such as LINUX™, an Internetwork Operating System (IOS™), or some other suitable operating system. Other layers included in the network device 105 include a kernel subsystem layer 111, a system call interface 110, and a management agent 106. The management agent 106 is a layer capable of processing network management instructions written in one of the aforementioned protocols. Additional middleware layers may also exist between the management agent 106 and API 107, and the other layers shown herein. Further, management agent 106 is capable of transmitting a network device response responsive to the network management instructions. As will be more fully discussed below, these various layers may be bound together and may communicate via various interfaces.

In some example embodiments, a managed resource may be a physical or logical entity that resides as part of the network device. A physical entity may be a chassis, a port, or a power supply. A logical entity may be a service entity, a network interface, or a connection. A physical or logical entity is a feature. A network device may be a router, switch, bridge, or other suitable network device capable of layer 1, 2, or 3 analyses. These layers are layers in the Transmission Control Protocol/Internet Protocol (TCP/IP) stack model or the Open Systems Interconnection (OSI) model.

In one example embodiment, the EI2D language is utilized in the development of one or more of the API 107 and component skeleton 108. The API 107 interfaces with the management agent 106, whereas the component skeleton 108 interfaces with a network device component 109. To interface includes making functions available for calling by another component, layer, or function. Calling means to retrieve for use. The management agent 106 is an application that processes network management instructions written in a protocol such as a Simple Network Management Protocol (SNMP), Netconf, an Internetwork Operating System-Command Line Interface (IOS-CLI), or some other suitable network management protocol. The network device component 109 may be, for example, a routing engine or other suitable component utilized by the network device to access a managed resource. The component skeleton 108 is an interface of the network device component 109 is that is provided by the managed resource instrumentation application 104.

Figure 2:
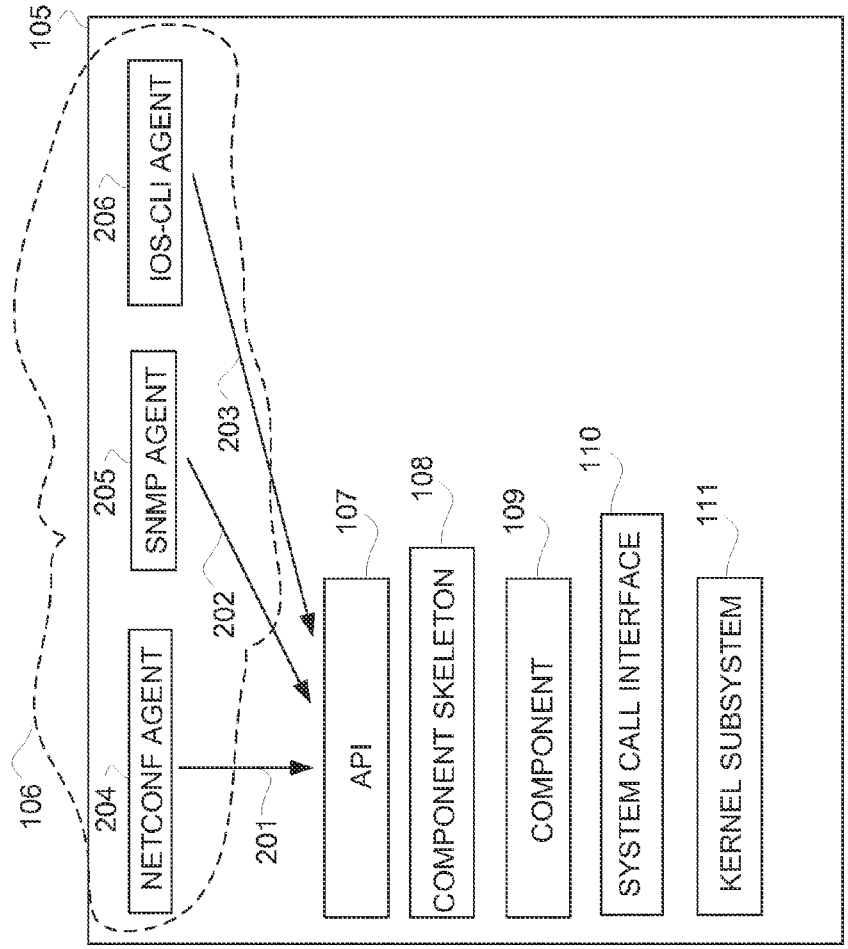
FIG. 2 is a diagram of an example component architecture, according to an example embodiment, illustrating the interaction between the management agent and the Application Programming Interface (API).

FIG. 2 is a diagram of an example component architecture 200 illustrating the interaction between the management agent 106 and the API 107. Shown are various example agents that make up the management agent 106. These agents include a component capable of processing a network management instruction and generating a network device response. These example agents include a Netconf agent 204, a SNMP agent 205, and an IOS-CLI agent 206. Each of these respective example agents is mapped to the API 107 (see e.g., mapping 201, 202, and 203). Mapping 201, 202, and 203 include the binding of functions of each of the management agents 204-206 to functions of the API 107, such that specific functions of the management agents 204-206 call specific functions of the API 107. In an embodiment, an instantiation of a binding that is data driven includes referencing one or more management agents 204-206 to one or more functions of the API 107. For example, the binding can be a reference (e.g., a pointer to a function) to something that is larger and more complicated and used frequently (e.g., another function or set of functions). In an alternate embodiment, an instantiation of a binding that is compiled includes a mapping one or more management agents 204-206 to one or more functions of the API 107. For example, where a mapping exists for an agent, the agent has functions available to it that are utilized (e.g., called) to further process a network management instruction.

In some example embodiments, certain principles of development-time versus run-time may be used in understanding the concept of mapping. Development time mapping may include the association of the management agent interface data with the "interface" data. The development time mapping data can be used at run-time in two or more ways. For example, development time mapping can be transformed into compiled code, or it can be used in a data driven run-time mapper. Referencing as cited above is an example of a data driven run-time mapper.

Figure 3:
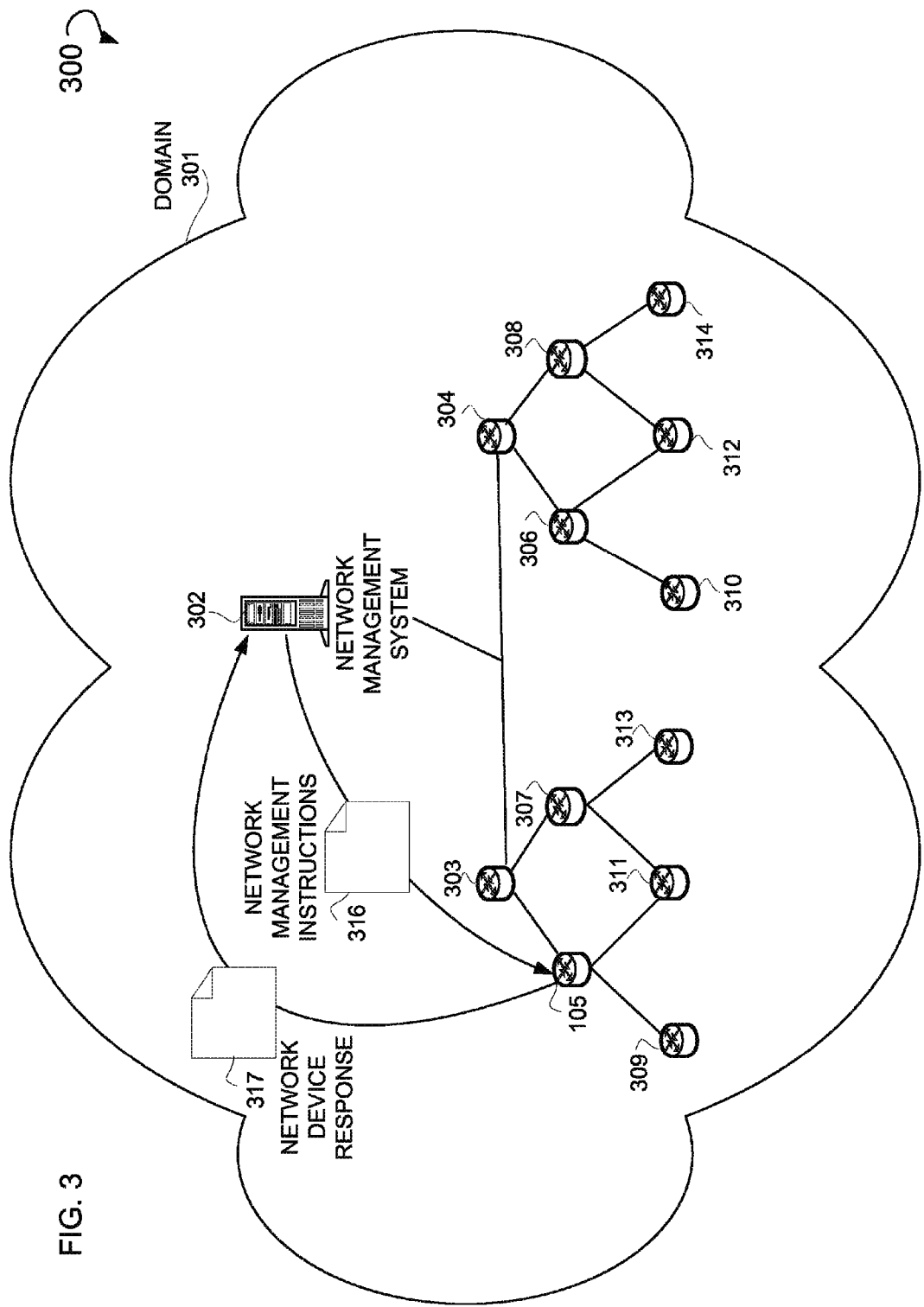
FIG. 3 is a diagram of a system, according to an example embodiment, for generating network management instructions and for receiving a network device response.

FIG. 3 is a diagram of an example system 300 for generating network management instructions and for receiving a network device response. Shown is a domain 301 that includes various network devices managed by a network management system 302. Domain 301 may be a Local Area Network (LAN), a Wide Area Network (WAN), the internet, or some other suitable network and associated topology. The network management system 302 may be a computer system utilizing a Cisco Active Network Abstraction™ (CANA) platform or a Hewlett-Packard OpenView™ platform. In some example embodiments, a plurality of network devices is shown, including network devices 303-304 and 306-314. Also shown is the previously illustrated network device 105. These network devices may be routers acting as a Provider Edge (PE), a Customer Edge (CE), or some other suitable network device. The network management system 302 and the network devices 303-304, 306-314, and 105 may be logically or physically connected within the domain 301.

In one example embodiment, the network management system 302 may generate and transmit network management instructions 316 to be received by the network device 105. The network management instructions 316 may be written using the aforementioned SNMP, Netconf, IOS-CLI, or some other suitable protocol. The network management instructions 316 requests information relating to features of a network device, such as the status of a managed resource. A network device response 317 is transmitted by the network device 105 to be received by the network management system 302. This network device response may include information related to a managed resource or feature of the network device 105. As illustrated above, a managed resource may include chassis, port, network interface, or power supply information.

Figure 4:
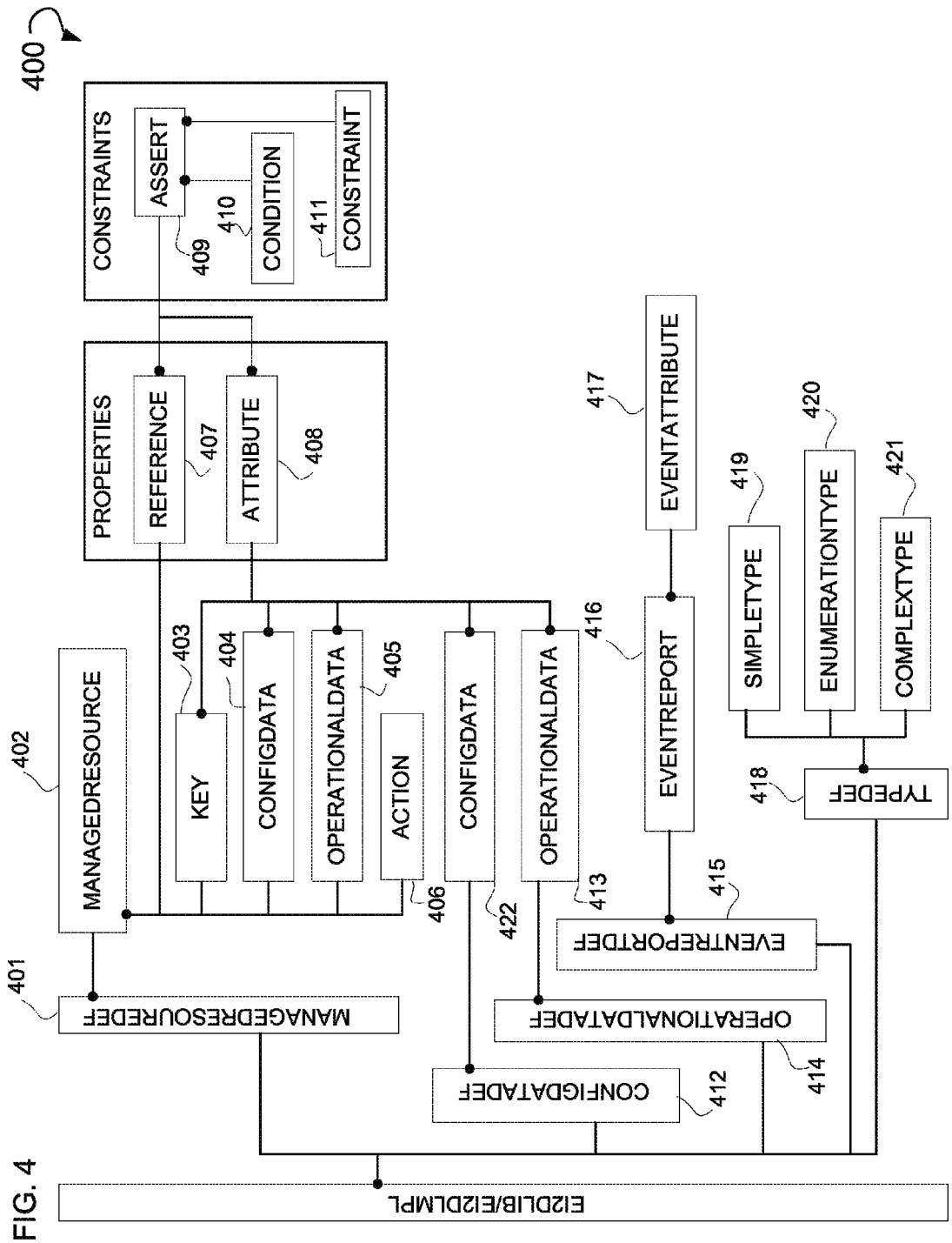
FIG. 4 is a diagram of a language structure, according to an example embodiment, of an Embedded Instrumentation Interface Definition (EI2D) language.

FIG. 4 is a diagram of an example structure 400 of an EI2D language. The EI2D language itself is described via a grammar written as a schema definition. This schema may be written as an eXtensible Markup Language (XML) Schema (XSD), a Document Definition Markup Language (DDML) schema, a Document Schema Definition Languages (DSDL) schema, a Document Structure Description (DSD) schema, or as a Document Type Definition (DTD). Individually or collectively these are referred to as XML data models. The EI2D language, in certain cases, is illustrated below using Backus-Naur Form (BNF) metasyntax notation. Shown is a managed resource definition 401 that is implemented as a managed resource 402. In some example embodiments, managed resource 402 may be an object having attributes and methods associated with the managed resource 402. Further, as is the example with objects, the managed resource 402 may have characteristics of polymorphism and inheritance associated with the managed resource 402. As is more fully illustrated below, an attribute for the managed resource 401 may be a key 403, configuration data 404, or operational data 405. Methods associated with the managed resource 401 may include action 406. Further, a managed resource 402 may have further attributes in the form of reference 407 and attribute 408. Various types of constraints in the form of conditional statements (e.g., case statements) may be used to manipulate a managed resource 402. These constraints may be an assert 409, condition 410, or constraint 411.

In some example embodiments, a configuration data definition 412 is shown, as is an operational data definition 414, and event report definition 415. These various definitions may be implemented as a configuration data 422, operational data 413, and an event report 416. Configuration data 422 may refer to data that determines and guides the behavior of the managed system, and may include a set of attributes, each attribute representing one particular data item. Operational data 413 may be management information that is not configuration data. Further, operational data 413 may refer to data that results from the operation of the managed system, such as operational state, performance data, and utilization data, which is data that is in effect determined by the managed system and that results from its behavior. An event report 416 may reference the notification messages that are associated with a particular type of managed resource. Additionally, an event report 416 may have an event attribute 417 associated with it.

Some example embodiments may include a type definition 418 that may include a simple type 419, an enumerated type 420, and/or a complex type 421. A type definition 418 defines various data types associated with a managed resource. These data types are more fully shown below, but may include an integer, string or other suitable primitive data type in the form of simple type 419, an enumerated data type in the form of enumeration type 420, or a structure or object type in the form of complex type 421. The BNF form for a managed resource, and its associated attributes and method, are shown below along with some example implementations written in the EI2D language.

In one example embodiment, a <managedResource> element, referenced above as a managed resource 402, is implemented. This <managedResource> element, defined as part of the EI2D library, defines a managed resource, its relationships with other managed resources, its attributes (e.g., grouped under <configData> and <operationalData> elements), its actions (e.g., methods), and its events, The following table provides an example XSD-based definition of a managed resource, and an example EI2D-based language implementation thereof:

| Managed Resource |
|---|
| <managedResource name = <u>string</u><br>    (implements extends) = <u>string</u><br>    maxAccess = ( read-only | read-write | read-create | read-update )<br>        : read-write<br>    status = ( current | deprecated | obsolete ) : current><br>  Content: (<br>    description?,<br>    key*,<br>    reference*,<br>    configData*,<br>    operationalData*,<br>    eventReport*,<br>    action*<br>  )<br></managedResource> |

| | |
|---|---|
| {name} | The name of the ManagedResource. |
| {implements} | Applicable in an implementation package. Specifies the library managed resource that this managed resource implements, if any. |
| {extends} | Applicable in a library package. Specifies the base managed resource this managed resource is derived from, if any. |
| {maxAccess} | The maximum access of the managed resource and its containing reference and attribute properties. In general this field can include a. string bitmap of the following format and bits: [crud]. To make the managed resource read only, the value may be [-r--]. In most example cases, however the following short-hand should be used: read-only. The max access of managed resource affects the max access of its Properties. In general, the rule is the property's max access cannot 'turn-on' its containing managed resource max access bits. For the short-hand notations, the following table describes their relationships. |

| Properties max access | managedResource | Properties |
|---|---|---|
| Rules | read-only | implicitly read-only<br>Property max access ignored |
| | read-write | implicitly read-write<br>Valid restrictions of Property max access read-only or read-create (other values are invalid and should be ignored) |
| | read-create | implicitly read-create<br>Valid restrictions of Property max access :<br>read-only (other values are invalid and should be ignored) |

| Managed Resource | |
|---|---|
| read-update | implicitly read-write<br>Valid restrictions of<br>Property max access :<br>read-only (other values<br>are invalid and should be<br>ignored) |
| {status} | If obsolete, it should not be used in R1 interface. If deprecated, it is to be supported in the R1 interface but marked deprecated. |
| <key> | specifies the key attribute(s) of the ManagedResource. |
| <reference> | defines a reference to another ManagedResouree. |
| <configData> | groups configuration data attributes of the ManagedResource. |
| <operationalData> | groups operational data attributes of the ManagedResource. |
| <eventReport> | defines the events that can be emitted by the ManagedResource. |
| <action> | defines an arbitrary (non-configuration) operation on the ManagedResource. |

Example:
```
package ( name = "sub_cdp" ) {
  managedResourceDef {
    managedResource ( name = "CDPService") {
      description "Cisco Discovery Protocol (CDP) Service"
      configData {
        attribute ( name = "advertiseV2" type = "boolean" ) {
          description "enable Cisco Discovery Protocol Version 2 (CDPv2)"
        }
        attribute ( name = "logMismatchDuplex" type = "boolean" ) {
          description "enable all duplex mismatches on all Ethernet interfaces"
        }
        attribute ( name = "timer" type = "int" unit = "sec") {
          description "Rate at which CDP packets are sent (in sec)"
          assert { constraint "range(5..254)" }
        }
        attribute ( name = "holdTime" type = "int" unit = "sec" ) {
          description "Length of time (in sec) that receiver must keep this packet"
          constraint { constraint "range(10..255)" }
        }
      }
      operationalData ( ref = "CDPNeighbor" )
    }
    managedResource ( name = "CDPinterface" )
      configData {
        attribute ( name = "enable" type = "boolean" ) {
          description "enable Cisco Discovery Protocol (CDP) on this interface"
          constraint { constraint "default(true)" }
        }
        attribute ( name = "logMismatchDuplex" type = "boolean" ) {
          description "enable all duplex mismatches on this interfaces"
        }
      }
    }
  }
}
operationDataDef {
  operationalData ( name = "CDPNeighbor") {
    attribute ( name = "deviceId" type = "string" ) {
      description "The configured ID (name), MAC address,
        or serial number of the neighbor device."
    }
    attribute ( name = "addresses" type = "string" ) {
      description "A list of network addresses of neighbor devices."
      size "1..*"
    }
    attribute ( name = "localInterface" type = "string" ) {
      description "The protocol being used by the connectivity media."
    }
    attribute name = "localPortId" type = "int" ) {
      description "The protocol and port number of the device."
    }
    attribute ( name = "platform" type = "string" ) {
      description "The product number of the device."
    }
    attribute ( name = "capabilities" ) {
      enumerationType {
        enumeration ( value = "Router" )
        enumeration ( value = "TransparentBridge" )
        enumeration ( value = "SourceRoutingBridge" )
        enumeration ( value = "Switch" )
```

| Managed Resource |
|---|
| ```
            enumeration ( value = "Host" )
            enumeration ( value = "IGMPDevice" )
            enumeration ( value = "Repeater" )
         }
         description "The capability discovered on the device. This is the type
            of the device listed in the CDP Neighbors table."
         size "0..*"
      }
      attribute ( name = "holdTime" type = "int" unit = "sec" ) {
         description "The remaining amount of time, in seconds, the current device
            will hold the CDP advertisement from a transmitting router
            before discarding it."
      }
      ...
   }
 }
}
``` |

As alluded to above, in some example embodiments, a key is a special attribute or set of attributes used to identify the managed resource. The key may be unique within a scope. For example, two different scopes may be defined: unique across instances of the same type of managed resource of an instrumentation provider or unique across the instances of the same type of managed resource of an including parent managed resource. In addition, the value of a key may not change during the lifetime of the managed resource, from the moment the managed resource is created to the moment in which the key is deleted. A key may be in effect read-only or read-create. The key value may need to be assigned by the manager when an instance of the managed resource is created in instances of the managed resource type that can be created by a manager. In some example embodiments, the key value is assigned by the agent.

In some example embodiments, a <key> element, referenced above as key 403, is defined as part of the EI2D library and includes one or more configuration attributes that specify anon-opaque-unique ID for a particular managed resource. An "asNumber" of a Border Gateway Protocol (BGP) service may be an example of such a unique ID. Some example embodiments may include a default in the form of the scope of the key being a class (e.g., a managed resource (and its subclasses), within a managed system (possibly containing multiple instrumentation providers)). If, however, the managed resource is included under another managed resource through an inherited type relationship (e.g., "is-a" inheritance or "has-a" inheritance) or a parent-child relationship, the key can be made unique by its parent through setting the scope to the parent. The value of the key attribute is not allowed to change over the lifetime of the object; the underlying attribute must hence have a maxAccess of read-only or read-create. In an example case of the attribute being read-only, the value of the key is assigned by a management agent upon creation. In an example case where the attribute is read-create, it is assigned by a management application. The following is the XSD-based definition of a key.

| Key Attribute Property |
|---|
| ```
<key scope = ( class | parent ) : class >
   Content: (
      description?,
      attribute*
   )
</key>
{scope} Scope of the key attribute.
``` |

In some example embodiments, configuration data is data that would be included in the operating system of a network device as a configuration file. Configuration data may refer to data that determines and guides the behavior of the managed system. Configuration data may include a set of attributes, each representing one particular data item. Configuration data may be subject to configuration (e.g., creation, update/modification, deletion) by network administrators or management applications, in addition to being subject to retrieval. In some example embodiments, configuration data is included in the managed resource definition in one of two ways. First, configuration data may be specified inline, as a set of configuration attributes. Second, configuration data references a configuration data definition that is specified out-of-line, as a configuration data definition either in the same EI2D implementation, or in an EI2D library package. In some example embodiments, if a configuration data definition is referenced from an EI2D library, the configuration data can be extended with new attribute definitions. Extension may include adding to the functionalities of the configuration data definition by incorporating the new attribute functions.

In some example embodiments, the <configData> element, referenced above as configuration data 404 and 422, is defined as part of the EI2D library. The <configData> element may group a set of related configuration attributes of a Managed Resource. In some example cases, configuration data is provided by a managing application upon creation of a managed resource. Configuration data elements can be defined in the two forms: in-line under <managedResource>, or stand-alone under <configDataDef> to make its definition usable from more than one <managedResource> definitions. In some example embodiments, <configData> is defined inline as part of a managed resource, and may be anonymous, or may be optionally be named. Some attributes under anonymous <configData> elements share a common name space (e.g., their containing MR name). A namespace is an abstract container providing context of a scope for an element. The inline <configData> name can be used to introduce one extra level of namespace; with this, the name of the attribute is prefixed with the <configData> name. The following is the XSD-based definition of configuration data, and an example EI2D language implementation.

| Configuration Data |
| --- |
| <configData    name = string<br>              ref = string<br>              (implements\|extends) = string<br>              status = ( current \| deprecated \| obsolete ) : current ><br>  Content: (<br>    description?,<br>    attribute* ,<br>  )<br></configData><br>{name}           The name of the configData.<br>{ref}             The name of a stand-alone configData that it refers to. (Inline form only.)<br>{implements}   The EI2D Library configData that this configData implements and extends. Use fully qualified name prefixed with the library package.<br>{extends}       Applicable only in a Library package. This specifies the base configData this configData is derived from.<br>Example:<br>managedResourceDef<br>{<br>  managedResource ( name = "BGPService" )<br>  {<br>    ...<br>    configData { /* anonymous */<br>      attribute ( name = "userLabel" type = "String" )<br>      ...<br>    }<br>    /* anonymous refering to a shared definition */<br>    configData ( ref = "BGPPathAttributes" )<br>    /* named. This introduce one extra level of name */<br>    configData ( name = "pathAttributes" ref = "BGPPathAttributes")<br>    ...<br>  }<br>}<br>configDataDef {<br>  /* The stand-alone definition for reuse by multiple MR definitions */<br>  configData ( name = "BGPPathAttributes" ) {<br>    attribute ( name = "isNegated" type = "boolean" )<br>    attribute ( name = "isEnabled" type = "boolean" )<br>    ...<br>  }<br>} |

In some example embodiments, the operational data definition 414 defines a set of operational data that can be included multiple managed resource definitions and is defined as part of the EI2M library. In one example embodiment, an <operationalData> element referenced above as operational data 405 and 413 groups a set of related operational data attributes of a managed resource. Operational data attributes may be inherent or may be owned by the instrumentation provider—they reflect internal state and can be read. Operational data can be defined in the two forms: in-line under <managedResource>, or stand-alone under <operationalDataDef> to make its definition usable from more than one <managedResource> definition. Further, operational data that is defined inline as part of a managed resource may be anonymous or may optionally be named. All attributes under anonymous <operationalData> elements share as name space their containing MR name. The optional inline <operationalData> name can be used to introduce one extra level of name space; with this, the name of the attribute is prefixed with the <operationalData> name. To be used by multiple Managed Resource definitions, <operationalData> is defined as stand-alone; the Managed Resource definitions is not sufficient for it to be named. The following is the XSD-based definition of operational data, and an example EI2D language implementation.

| Operational Data |
| --- |
| <operationalData   name = string<br>                    ref = string<br>                    (implements\|extends) = string<br>                    status = ( current \| deprecated \| obsolete ) : current ><br>  Content: (<br>    description?,<br>    attribute* ,<br>  )<br></operationalData><br>{name}           The name of the operationalData.<br>{ref}             The name of a stand-atone operationalData that it refers to. (Inline form only.)<br>{implements}   The EI2D Library operationalData that this operationalData implements and extends. Use fully qualified name prefixed with the library package.<br>{extends}       Applicable only in a Library package. This specifies the base operationalData this operationalData is derived from.<br>Example:<br>managedResourceDef<br>{<br>  managedResource ( name = "BGPService" )<br>  {<br>    ...<br>    operationalData { /* Anonymous */<br>      attribute ( name = "upTime" }<br>    }<br>    /* Anonymous refering to a shared definition */<br>    operationalData ( ref = "BGPInterfaceStatistics" )<br>    /* Optionally named */<br>    operationalData ( name = "interfaceStatistics" ref = "BGPInterfaceStatistics")<br>    ...<br>  }<br>}<br>operationalDataDef {<br>  /* Stand-alone definition to be shared by more than one MR definitions */<br>  operationalData ( name = "BGPInterfaceStatistics" ) {<br>    attribute ( name = "inUpdates" type = "unsignedInt" )<br>    attribute ( name = "outUpdates" type = "unsignedInt" )<br>    ...<br>  }<br>} |

In some example embodiments, actions are methods that can be invoked on a managed resource whose functionality goes above and beyond what an operational primitive would provide. Actions include a set of input and output parameters. For example, the <action> element defined as part of the EI2D library and referenced above as action 406, specifies an arbitrary operation such as debugging or test operations on the managed resource. The following is an XSD-based definition of an action.

| Action |
| --- |
| <action name = string><br>  Content: (<br>    description?,<br>    inputParameter*,<br>    outputParameter*,<br>    errorParameter*<br>  )<br></action><br>{name}                The name of the action.<br>{inputParameter}    Input parameters. |

| Action | |
|---|---|
| {outputParameter} | Output parameters. |
| {errorParameter} | Error parameters. |

| Parameters | |
|---|---|
| <inputParameter | name = string |
| | type = string> |
|   Content: description? | |
| </inputParameter> | |
| <outputParameter | name = string |
| | type = string> |
|   Content: description? | |
| </outputParameter> | |
| <errorParameter | name = string |
| | type = string> |
|   Content: description? | |
| </errorParameter> | |
| {name} | The name of the parameter. |
| {type} | The data type of the parameter. This can be one of the built-in simple types or user defined types specified in the typeDef section. |

In some example embodiments, a <reference> element is defined as part of the EI2D library and corresponds to the reference 407 illustrated above. The <reference> element is a property of a managed resource that points to or references one or more associated managed resources. It is used for navigating an association between two or more managed resources. In some example embodiments, bidirectional association requires two references, declared as inverse of each other, one on each end of the associated managed resources. Association between two managed resources can be one-to-one, one-to-many, or many-to-many. The following is the XSD-based definition of a reference.

| Reference Property | |
|---|---|
| <reference | name = string |
| | targetIsA = string |
| | targetRole = ( parent | child | peer ) : peer |
| | multiplicity = ( one | many ) : one |
| | inverse = string |
| | maxAccess = ( read-only | read-create | implicit ) : implicit |
| | deleteRule = (restrict | nullify) : nullify> |
|   Content: ( | |
|     description?, | |
|     assert*, | |
|   ) | |
| </reference> | |
| {name} | The name of the reference. Naming guide: this name typically describes the role or type of the target ManagedResource. For example, A is a parent and B is a child. Reference definition in A that points to B could be named something like 'myChild' (B role is child). The name could also be prefixed with the association name, if necessary. |
| {targetIsA} | specifies the target ManagedResource type name. If the value is a library EI2D MR, the reference is polymorphic. Its value may point to any implementation MR that implements that library MR. If not specified, the target is any managedResource. |
| {targetRole} | specifies whether the association is parent-child or peer-to-peer. The value by default is peer. A value of child specifies that the reference points to the child in a parent-child composition relationship. Deletion of the parent will delete the child entities. |
| {multiplicity} | If one, the reference points to a single MR (default). If many it is a collection of references. It can be further constrained using the size constraint. |
| {inverse} | specifies the inverse reference name to be created in the target ManagedResource to specify a bi-directional association. This name should reflect the role the containing ManagedResource plays in the context of the association. The targetRole needs to be compatible - for a targetRole of "peer," the inverse reference must be of targetRole "peer" as well; for a targetRole of "child," an inverse reference must be of targetRole "parent"; finally, for a targetRole "parent," the inverse reference must be of targetRole "child". |
| {maxAccess} | specifies a restriction over the implicit maxAccess defined by the containing managedResource or configData maxAccess. Please refer to the table in section. |
| {deleteRule} | Applicable only if {inverse} is specified and for peer role, a restrict value would prevent the deletion of this managedResource until the reference is nullified explicitly - that implies the reference maxAccess must allow the reference to be writeable. A nullify value would automatically nullify - this reference when the ManagedResource is deleted. |

In some example embodiments, the <attribute> element, corresponding to attribute 408 outlined above, specifies an attribute property of a managed resource, configuration data, or operational data. An attribute with the multiplicity of many implies a collection of values (e.g., non-scalar). A multiplicity of one implies a single value or null value (e.g., subject to further restriction by a "size" constraint). The following is the XSD-based definition of an attribute.

| Attribute Property | |
|---|---|
| <attribute | name = string |
| | type = string |
| | multiplicity = ( one | many ) : one |
| | unit = string |
| | status = ( current | deprecated | obsolete ) : current |
| | maxAccess = read-only | read-create | implicit ) : implicit> |
|   Content: ( | |
|     description?, | |
|     assert* | |
|   ) | |
| </attribute> | |
| {name} | The name of the attribute property. |
| {type} | The data type of the attribute property. This can be one of the built-in simple types or user defined types specified in the typeDef section. |
| {multiplicity} | If one, the attribute is a scalar (default). If many it is a collection. It can be further constrained using size constraint. For example a list with size(0..10) can contain at most 10 entries. |
| {status} | If obsolete, it should not be used in R1 interface. If deprecated, it is to be supported in the R1 interface but marked deprecated. |
| {unit} | The unit of the attribute property, E.g. msec. (The EI2D tool can provide enum of standard units.) |
| {maxAccess} | The restriction over the implicit maxAccess defined by the containing managedResource or configData maxAccess. Please refer to the table in section. |

In some example embodiments, the <assert> element, referenced above as an assert 409, relates to the <constraint> element that defines a constraint of its containing <attribute>, <eventAttribute>, and <reference> elements. The <condition> element, referenced above as condition 410, specifies the condition applied to the associated constraint. For example, the <condition> element is provided to specify the following type of constraint: If (attribute X is . . . ) then (attribute Y constraint is . . . ) where the constraint of Y is dependent on X value.

In some example embodiments, the <condition> element, referenced above as condition 410, is also used to specify the condition in the <attributeGroup> elements. For example, if zero or more <constraint> elements with different <condition> appears under its containing elements. The condition is to be evaluated in order, like a case statement, with the unconditional <constraint> as default constraint. Further, order precedence rules apply such that the "( )" operator takes precedence over the "not" operator, which in turn takes precedence over the "and" operator, which takes precedence over the "or" operator. The following is the XSD-based definition of a constraint and a condition along with an example EI2D language implementation.

Constraint and Condition

```
<assert>
   Content: (
      condition?,
      constraint
   )
</assert>
<condition>
   Content: ( Condition Expression )
</condition>
<constraint>
   Content: ( Constraint Expression )
</constraint>
Simple Constraint Example:
   attribute ( name = "vlanId" type = "unsignedShort" ) {
      assert { constraint "values(0..4095)" }
   }
   attributename = "vlanMTUSize" type = "unsignedInt" ){
      description "The MTU size to be set across the VLAN."
      assert { constraint "size(0..1),
values(minMTUSize..maxMTUSize)" }
   }
Conditional Constraint Example:
configData ( name = "MPLS:PathOptionSettings" ) {
   ...
   attribute ( name = "isExplicit" type = "boolean" ) {
      description "Boolean indicating whether an explicit (True)
         or dynamic (False) path is preferred.
         If True, the path MUST be defined using
         the Explicit:Path association."
   }
   attribute ( name = "explicitPath" type = "ExplicitPath" ) {
      description The path when the isExplicit boolean is True."
      assert {
         condition "isExplicit.values(true)"
         constraint "size(1)"
      }
   }
   ...
}
Generic Examples:
/* IF prop1 equals to 5 THEN prop2 < prop3 */
attribute ( name = "prop2" ) {
   assert { condition { prop1.values(5) }
      constraint { values(*..prop3) } }
}
/* IF prop1 > prop2 THEN ref3 type is footype AND value of prop4 = 7 */
reference ( name = "ref3" ) {
   assert { condition { prop1.values (prop2..*) }
      constraint { values(footype) } }
}
attribute ( name = "prop4" ) {
   assert { condition { prop1.values(prop2..*) }
      constraint { values(7) }
}
/* IF prop1 equals to "x" THEN prop2 equals to "y" ELSE prop2
equals to "z
The list of asserts is like a case statement.
If the ELSE part is a default, then it can be a default constraint */
attribute ( name = "prop2 ) {
   assert { condition { prop1.values("x") }
      constraint { values("y") } }
   assert { constraint { values("z") } }
}
/* If the ELSE part is only 'not (prop1 equals to "x")' then */
```

Constraint and Condition

```
attribute ( name = "prop2 ) {
   assert { condition { prop1 values("x") }
      constraint { values("y") } }
   assert { condition { not ( prop1 values("x") ) }
      constraint { values("z") } }
}
```

In some example embodiments, a grammar written in BNF for constraint and condition expressions is presented as follows:

```
<constraintExpr> ::= <constraint> [ "," <constraint> ]
<constraint> ::= ( ( "values" "(" <valueOrRange> ")" )
   | ( "default" "(" <value> ")" )
   | ( "size" "(" <valueOrRange> ")" )
   | ( "strlen" "(" <valueOrRange> ")" )
   | ( "regex" "(" <regexString> ")" )
   | ( "max_access" "(" <maxAccess> ")" )
)
<conditionExpr> ::=
   ["not"] ( <condition> [ [ "and" | "or" ] <conditionExpr> ] )
   | "(" <conditionExpr> ")"
<condition> ::= [ <prop> "." ](
   ( "values" "(" <valueOrRange> ")"
   | ( "size" "(" <valueOrRange> ")"
   | ( "strien" "(" <valueOrRange> ")"
   | ( "regex" "(" <regexString> ")"
   | ( "is_null" )
)
<prop> ::= [ [ <package> "." ] <entity> "." ]
            <propName> [ "." <propName> ]*
where:
   <propName> is a valid managedResource, configData or
      operationlData property.
   <entity> is managedResource, configData or
      operationalData name.
   <package> is the EI2D package name.
and:
   <valueOrRange> ::= <range> ["|" <range>] . . .
   <range> ::= <value>
            | <value> ".." <value>
   <value> ::= "-" <number>
            | <valid string-format of EI2D types>
            | "*"
where:
   <empty> is the empty string
   <number> is a non-negative integer
      "*" specifies an unbounded value. E.g. 1..* means value >= 1
   <range> is further restricted as follows:
      - any <value> used in a SIZE clause must be non-negative.
      - when a pair of values is specified, the first value
        must be less than the second value.
      - when multiple ranges are specified, the ranges may
        not overlap but may touch. For example, (1..4 | 4..9)
        is invalid, and (1..4 | 5..9) is valid.
      - the ranges must be a subset of the maximum range of the
        base type.
   -20..100
   0..100 | 300..500
   300..500 | 0..100
   0 | 2 | 4 | 6 | 8 | 10
   0..100
```

In some example embodiments, the meaning of constraint and condition elements is expressed as follows. A value is one or more of a value, value range, or enumeration. As a reference, a value specifies the target type or list of types that restrict the "targetIsA" specification. Further, a reference specifies a value of other property used as condition. Default specifies the default value. Property without a default value implies that a value needs to be specified when its entity is being created. Size restricts the multiplicity of the attribute or reference property. In case of an attribute, the following additional distinction applies. For an attribute of multiplicity "one," size 1 means a scalar, no "null" value allowed. Size 0 . . . 1 means a scalar, with a null value (unspecified) allowed. For an attribute of multiplicity "many," the size indicates size of the corresponding collection, i.e., number of distinct values associated with the attribute, in examples of a reference, the following distinction applies. For a reference of multiplicity "one," size 1 means a non-null valid reference, size 0 . . . 1 means a reference that can be null. For a reference of multiplicity "many," size 0 . . . * means a set of references, size 10 means a set of exactly 10 references. Strlen specifies the length or length range of a string type. Regex specifies the pattern of a string type. Max_access-specifies the constrained max_access. Is_null specifies if the value is null or unspecified.

The following table provides an example of how the size and default constraints affects the behavior of a managed resource during its creation in case of a property with multiplicity of "one." Analogous behavior applies in the case of multiplicity "many."

| Multiplicity | Size constraint | Default | Run-time Behavior |
| --- | --- | --- | --- |
| one | size(1) | not specified | Value mandatory during MR creation. |
| one | size(1) | specified | Value optional and set to default during MR creation. |
| one | size(0..1) | not specified | Value optional during MR creation. A get after create returns null value. Value can be set to null. |
| one | size(0..1) | specified | Value optional during MR creation. A get after create returns the default value. Value can be set to null. Value can be set to default. |

In some example embodiments, the <eventAttribute> element, referenced above as event attribute 417, is an attribute of the event report 416 which functions as the information fields of the event report. Its value refers to an attribute of a ManagedResource, its configData, or its operationalData. Events that can be emitted by instrumentation provider are defined as <eventReport> elements under <eventReportDef>. Under <eventReportDef>, <alarmIndication>, a special type of event, can be defined in addition to a generic <eventReport>. The following is the XSD-based definition of an event report.

| Event Report | |
| --- | --- |
| <eventReport | name = string |
| | severity = ( emergency \| alert \| critical \| error \| warning \| notice \| information \| debug ) |
| | implements = string |
| | status = ( current \| deprecated \| obsolete ) : current> |
| Content: ( | |
|   description?, | |
|   messageFormat?, | |
|   eventAttribute* | |
| ) | |
| </eventReport> | |
| <messageFormat> | |
|   Content: string | |
| </messageFormat> | |
| {name} | The name of the event. Because Syslog is the dominant external message format, this name should be formed using syslog convention. It should be formed using a Facility + "-" + Mnemonic tuple. |
| {severity} | The severity of this event. |

| Event Report | |
| --- | --- |
| {implements} | specifies the EI2D Library eventReport that this ManagedResource implements and extends. Use fully qualified name prefixed with the Library package. |

The <messageFormat> is equivalent to the syslog format definition. It is a format string for the textual description of the event. However, instead of the printf format's %-prefixed parameter, use the name of the event attribute with '$' prefix.
For example:
  <messageFormat>hello $name</messageFormat>
Use $$ to escape literal '$' in the messageFormat.
The $ prefixed variable can be further prefixed with % printf notation for formatting. For example: hello %10s$name. This printf notation prefix can also be used to internationalize the eventAttribute value formatting. (E.g. 10.0 vs 10,0 for decimal value.)
The <recommendedAction> is equivalent to the IOS msgdef definition recommend action definition. Instead of just text, it can include parameters as in the <messageFormat>. Note that the recommended action does not have to be emitted with the actual event itself during runtime; it is just included as part of the definition.
The <eventAttribute> element is an attribute of the eventReport. One or more of this info can be used as parameters in the <messageFormat> text. (Not all need to be used.)

In some example embodiments, an <eventAttribute> element is illustrated that corresponds to the event attribute 417. The <eventAttribute> element is an attribute of the eventReport, which functions as the information fields of the event report. The <eventAttribute> element value refers to an attribute of a ManagedResource, the ManagedResource configData or the ManagedResource operationalData. The following is the XSD-based definition of an event report,

| Event Attribute Definition | |
| --- | --- |
| <eventAttribute | name = string |
| | type = string |
| | relatedAttribute = string> |
| Content: ( | |
|   description?, | |
|   assert* | |
| ) | |
| </eventAttribute> | |
| {name} | The name of the attribute property. |
| {type} | The data type of the attribute property. This can be one of the built-in simple types or user defined types specified in the typeDef section. |
| {relatedAttribute} | If specified, it refers to the corresponding attribute of a ManagedResource (possibly an attribute that is part of its configData, or its operationalData.) |

In some example embodiments, a simple type 419 is defined as including the primitive data types outlined in the below table.

| Type | Applicable Constraints | Description |
| --- | --- | --- |
| unsignedByte | values/default/size | number type with implied constraint of values(0..255) |
| byte | values/default/size | number type with implied constraint of values(−128..127) |
| unsignedShort | values/default/size | number type with implied constraint of values(0..65535) |
| short | values/default/size | number type with implied constraint of values(−32768..32767) |

-continued

| Type | Applicable Constraints | Description |
|---|---|---|
| unsignedInt | values/default/size | number type with implied constraint of values(0..4294967296) |
| int | values/default/size | number type with implied constraint of values(2147483648..2147483647) |
| unsignedLong | values/default/size | number type with implied constraint of values(0..18446744073709551616) |
| long | values/default/size | number type with implied constraint of values(-9223372036854775808..9223372036854775807) |
| string | default/size/strlen/regex | |
| Boolean | default | |
| float | values/default/size | |
| double | values/default/size | |
| datetime | default/size | |
| duration | default/size | |
| anyURI | default/size | |
| hexBinary | size | |
| ipAddress | default | This represents all types and variants of an IP Addresses (including ipv6). Specific variants will be defined in the EI2D core library. |
| nsapAddress | default | This represents all types and variants of an NSAP Address. Specific variants will be defined in the EI2D core library. |

Figure 5:
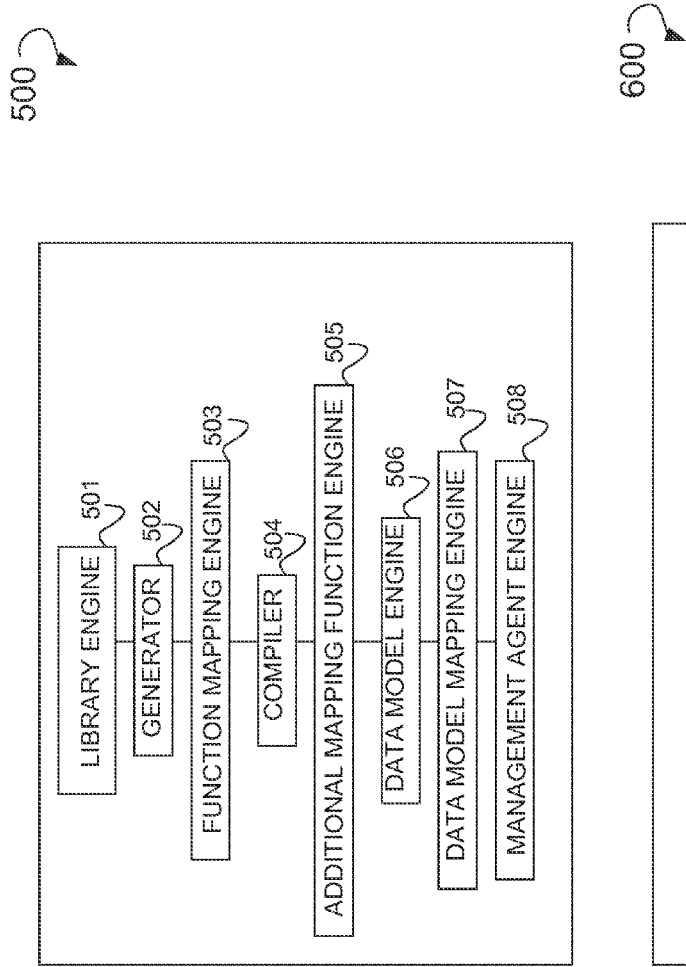
FIG. 5 is a block diagram of a computer system, according to an example embodiment, used to generate a managed resource instrumentation application.

FIG. 5 is a block diagram of an example computer system 500 used to generate a managed resource instrumentation application 104. The blocks represented within this block diagram may be implemented in hardware, firmware, or software. These blocks may be operatively coupled via a direct or indirect logical or physical connection. These blocks may be implemented as part of the development platform 103 (see e.g., FIG. 1). The blocks include a library engine 501, a generator 502, a function mapping engine 503, a compiler 504, an additional function mapping engine 505, a data model engine 506, a data model mapping engine 507, and a management agent engine 508.

Library engine 501 defines an interface that is independent of a management interface associated with a management agent. This library engine 501 may be used in conjunction with the EI2D editor 102. A management interface is one or more functions of a management agent, such as management agent 106, that are available for an external management application to use (see e.g., network management system 302 and associated applications and platforms).

Operatively coupled to the library engine 501 is a generator 502 to generate the API 107 from the management interface. An API is a set of declarations of the functions or procedures that is provided to support requests made by a software application.

Operatively coupled to the generator 502 is a function mapping engine 503 to bind the management agent and the API to implement the management interface associated with the management agent.

Operatively coupled to the function mapping engine 503 is a compiler 504 to compile the interface into a component skeleton of a feature of the managed device, the feature accessed by the management agent through the API, Accessed means to make available. Compile means to the translate the text written in one computer language into another computer language. Here, for example, an interface written in EI2D may be compiled into a component skeleton written in another computer language such as Java, C++, C#, or some other suitable programming language. In some example embodiments, an interpreter (not pictured) is used in lieu of the compiler 504.

Operatively coupled to the compiler 504 is an additional function mapping engine 505 to bind a function of the management agent and a function of the API to create a managed resource instrumentation application.

In some example embodiments, the computer system 500 further includes a data model engine 506 that is operatively coupled to the function mapping engine 505. The data model engine 506 generates an XML data model used in conjunction with the management agent, the management agent using, for example, the Netconf protocol.

Operatively coupled to the data model engine 506 is a data model mapping engine 507 to generate a binding between the XML data model and the API. Operatively coupled to the data model mapping engine 507 is a management agent engine 508 to execute a function of the API to access a managed resource instrumentation application. In some example embodiments, the interface is defined using an EI2D language. In some example embodiments, the function of the API includes at least one of a retrieval function, a modification function, a relationship-traversal function, an action-invocation function, an event-modification function, or a meta-data function. In some example embodiments, the feature includes at least one of operational data, configuration data, actions, relationship data, or events. In some example embodiments, an information retrieval function is used to retrieve information from a network device component. For example, this function is used to retrieve the current value of a packet counter. A modification function is used to modify configuration information. For example, configuration information includes a setting for a timeout value. An action invocation function is used to invoke actions not per se related to management data. For example, these actions include invoking a self test. An event function is used to communicate events from the network device component. Specifically, the network device component "calls out" to a function to communicate that an event has occurred. A metadata function provides introspection capabilities. Specifically, metadata function is used to find out what other functions are supported across the API.

Figure 6:
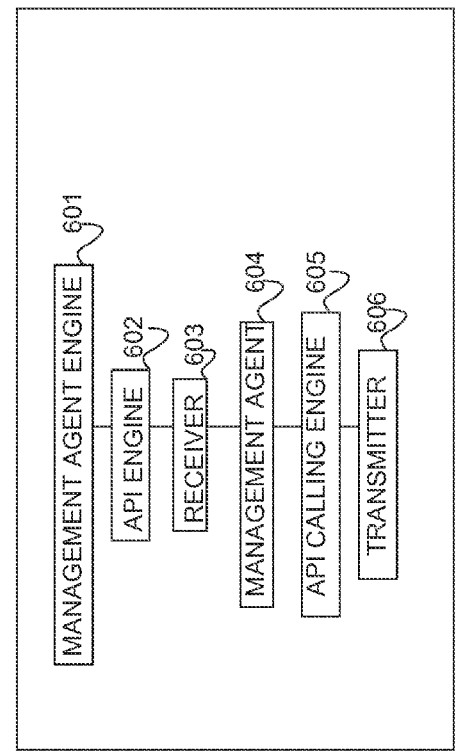
FIG. 6 is a block diagram of a computer system, according to an example embodiment, used to implement a managed resource instrumentation application.

FIG. 6 is a block diagram of an example computer system 600 used to implement a managed resource instrumentation application. The blocks represented within this block diagram may be implemented in hardware, firmware, or software. These blocks may be operatively coupled via a direct or indirect logical or physical connection. These blocks may be implemented as part of the development platform 103 or network device 105. The blocks include a management agent engine 601, API engine 602, receiver 603, management agent 604, API calling engine 605, and transmitter 606.

Management agent engine 601 calls an API function compiled from an interface that is independent of a management interface associated with a management agent. Operatively coupled to the management agent engine 601 is an API engine 602 to call a component function using the API function. Operatively coupled to the API engine 602 is a receiver 603 to receive a component function call result based upon the component function call. Operatively coupled to the receiver 603 is a management agent 604 to receive a network management instruction using at least one management agent. Operatively coupled to the management agent 604 is an API calling engine 605 to call the API function using the management agent, the API function included in a managed resource instrumentation application. Operatively coupled to the API calling engine 605 is a transmitter 606 to transmit a network device response that includes the component function call result.

Figure 7:
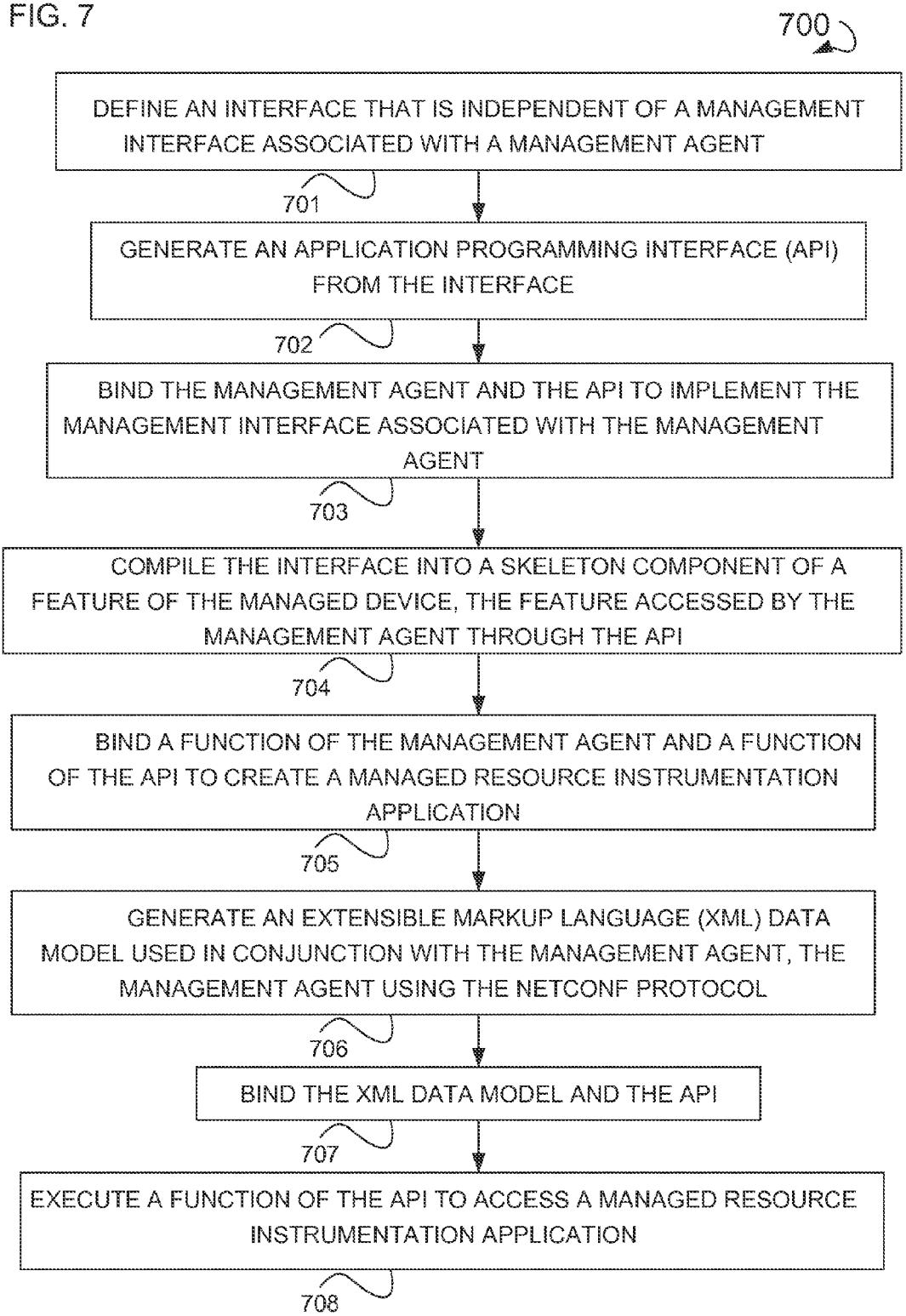
FIG. 7 is a flow chart illustrating a method, according to an example embodiment, used to generate a managed resource instrumentation application.

FIG. 7 is a flow chart illustrating an example method 700 used to used to generate a managed resource instrumentation application. Shown are operations 701-708. These operations may be executed by the development platform 103 or network device 105. Operation 701 is executed to define an interface that is independent of a management interface associated with a management agent. Operation 702 is executed to generate an API from the interface. Operation 703 is executed to bind the management agent and the API to implement the management interface associated with the management agent. In some example embodiments, operation 703 may be performed for each management agent (e.g., SNMP, CLI) implemented by a network device.

Operation 704 is executed to compile the interface into a component skeleton of a feature of the managed device, the feature accessed by the management agent through the API. In some example embodiments, operation 704 is executed to interpret a feature of the managed device, the feature accessed by the management agent through the API. Operation 705 is executed to bind a function of the management agent and a function of the API to create a managed resource instrumentation application. Collectively, operations 701 through 705 may be performed for any management interface. Operation 706 is executed to generate an XML data model used in conjunction with the management agent, the management agent using the Netconf protocol. Operation 707 is executed to bind the XML data model and the API. Operation 708 is executed to execute a function of the API to access a managed resource instrumentation application. In some example embodiments, the interface is defined using an EI2D language. In some example embodiments, the function of the API includes at least one of a retrieval function, a modification function, a relationship-traversal function, an action-invocation function, an event-modification function, or a meta-data function. In some example embodiments, the feature includes at least one of operational data, configuration data, actions, relationship data, or events.

Figure 8:
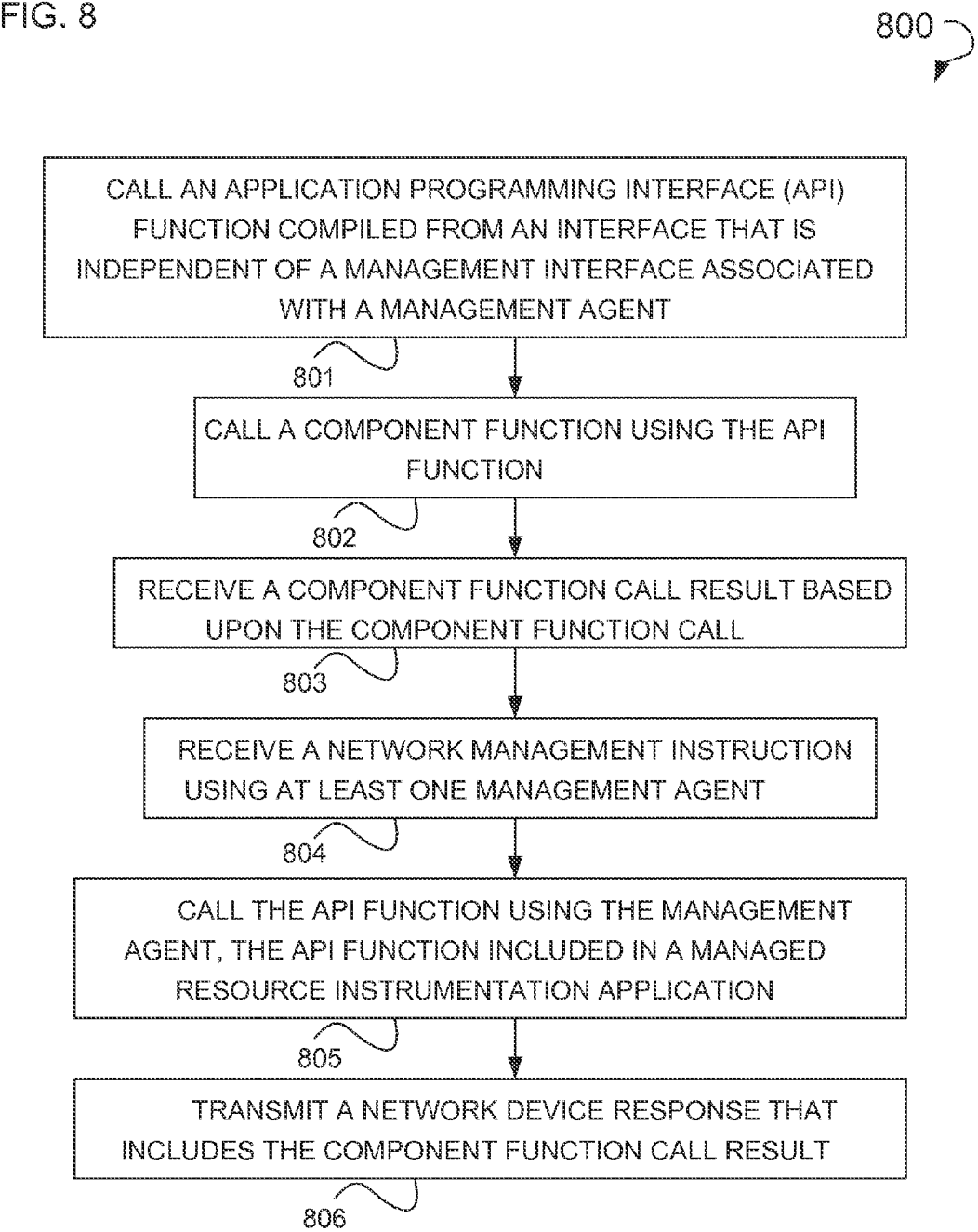
FIG. 8 is a flow chart illustrating a method, according to an example embodiment, used to implement a managed resource instrumentation application.

FIG. 8 is a flow chart illustrating an example method 800 used to implement a managed resource instrumentation application. Shown are operations 801 through 808. These operations may be executed by the development platform 103 or network device 105. Operation 801 is executed to call an API function compiled from an interface that is independent of a management interface associated with a management agent. In some example embodiments, this management interface is a management interface definition. Operation 802 is executed to call a component function using the API function. Operation 803 is executed to receive a component function call result based upon the component function call. Operation 804 is executed to receive a network management instruction using at least one management agent. Operation 805 is executed to call the API function using the management agent, the API function included in a managed resource instrumentation application. Operation 806 is executed to transmit a network device response that includes the component function call result.

Figure 9:
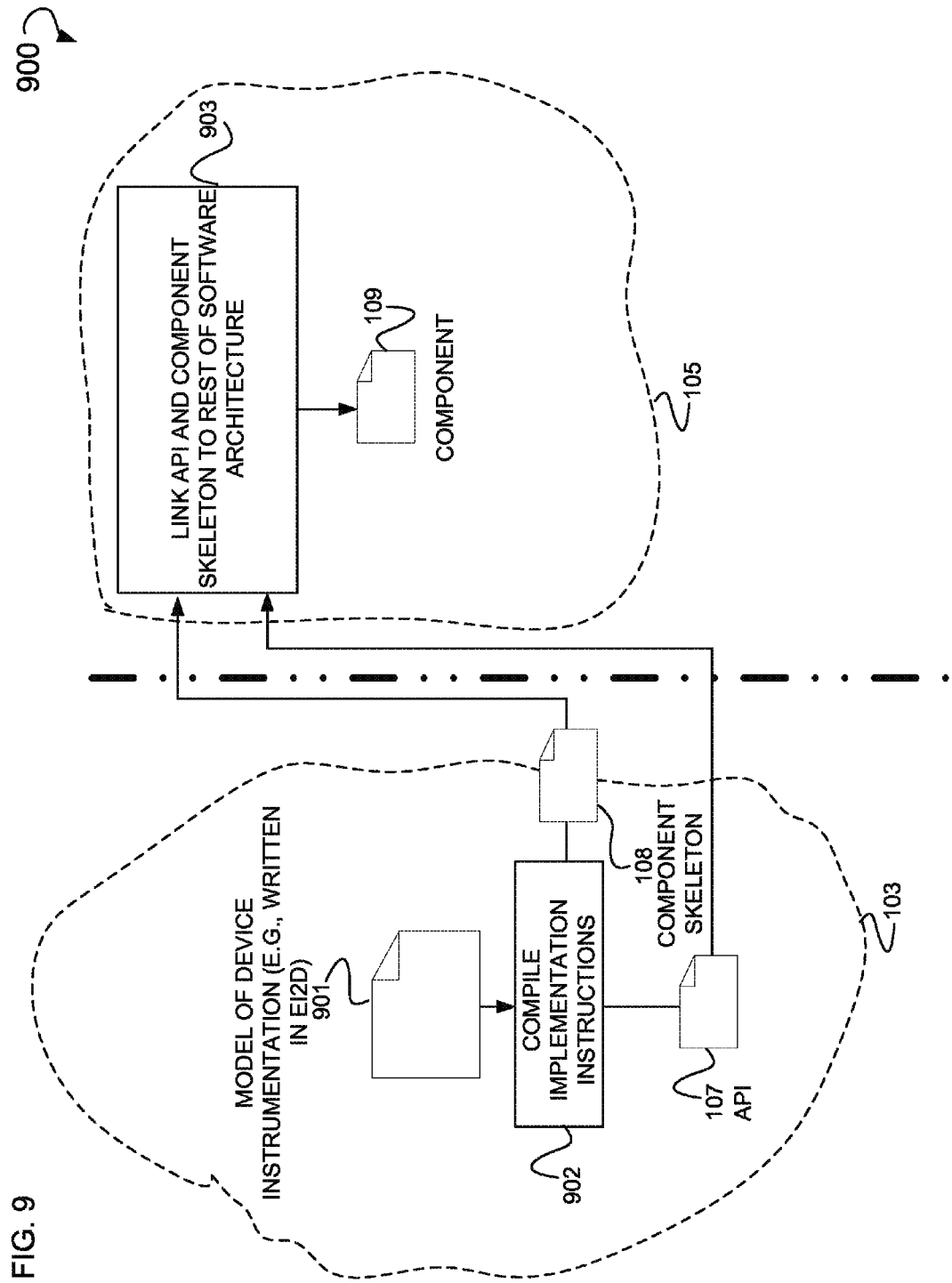
FIG. 9 is a dual-stream flow chart illustrating the generation of application layers, according to an example embodiment, and the installation of these layers in the network device.

FIG. 9 is a dual-stream flow chart illustrating a method 900 to generate the API 107, the component skeleton 108, and the installation of these layers in the network device 105. Shown is a model of device instrumentation 901 and operation 902 that resides upon and is executed by the development platform 103.

Figure 10:
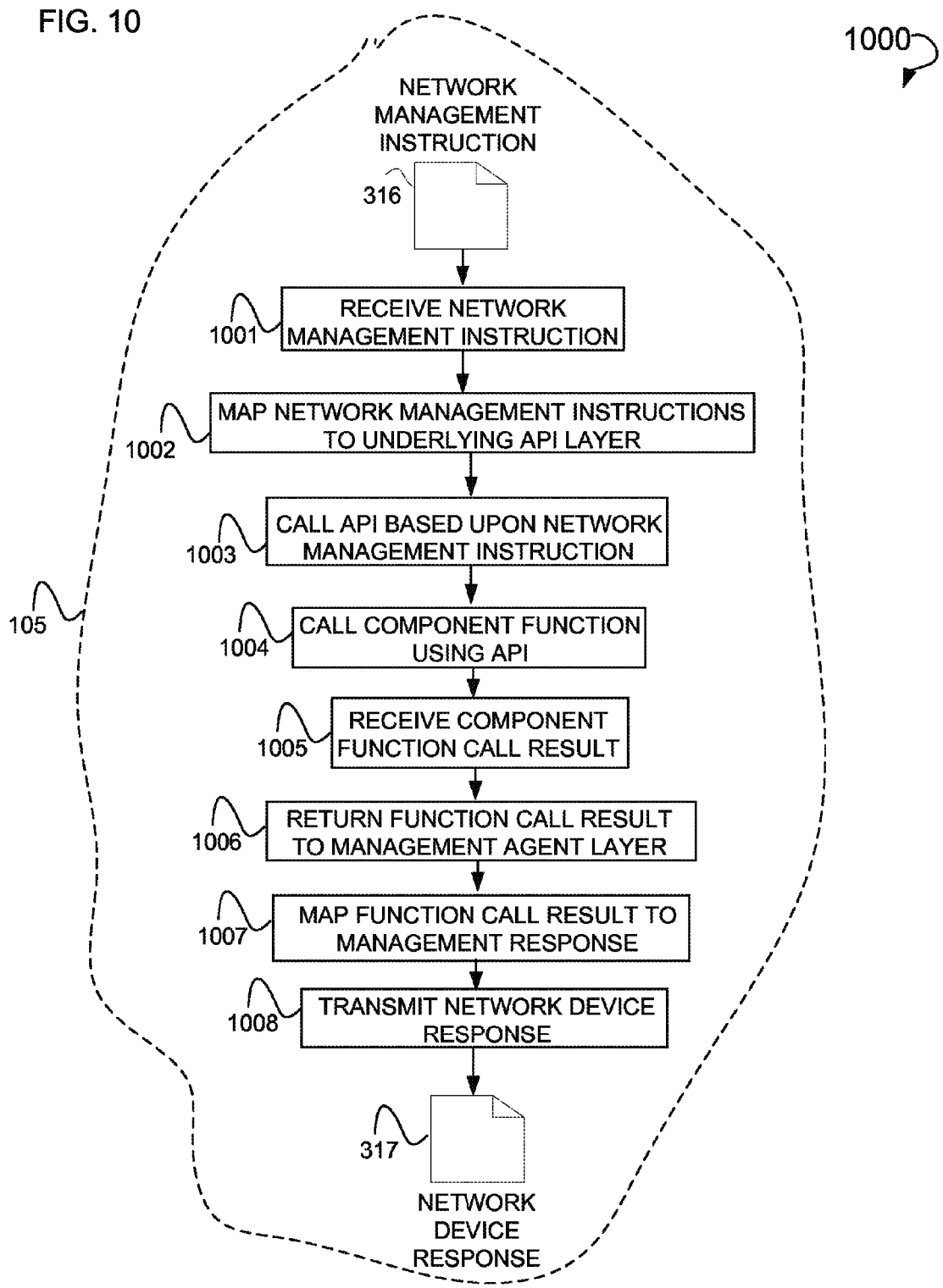
FIG. 10 is a flow chart illustrating a method, according to an example embodiment, used to process a network management instruction and to generate a network device response.

Also shown is an operation 903 that resides upon and is executed by the network device 105. The model of device instrumentation 901 may be written in the EI2D language and is compiled through executing the operation 902. The operation 902 may utilize the EI2D schema definition during the course of compilation. Through executing the operation 902, the managed resource instrumentation application 104 is generated that includes the API 107 and the component skeleton 108. In some example embodiments, the EI2D editor 102 is used to generate the managed resource instrumentation application 104. The operation 903 is executed to link or bind the various layers of the component architecture. Specifically, operation 903, when executed, maps API 107 to the management agent 106, and various agents included therein (e.g., Netconf agent 204, SNMP agent 205, and IOS-CLI agent 206). Further, operation 903, when executed, maps the component skeleton 108 to the network device component 109, FIG. 10 is a flow chart illustrating an example method 1000 used to process a network management instruction and to generate a network device response. Shown are various operations 1001-1008 that are executed by the network device 105. Illustrated is an operation 1001 that, when executed, receives the network management instruction 316. An operation 1002 is executed to map the network management instructions to the underlying API layer. Mapping may be a one-to-one mapping or a one-to-many mapping between the management agent 106 and the API 107. Further, this mapping may be data driven (e.g., driven by data types to be processed using the API 107), or may be hard coded such that specific functions are called and utilized.

Functions may be called from the API 107 by the management agent 106 once mapping occurs. Operation 1003 is executed to call the API 107, and associated functions, based upon the network management instructions 316. In some example embodiments, operation 1004 is executed to call a component function that is part of the network device component 109. These component functions may include functions specific to the operation of the network device 105. For example, functions related to routing may exist and be called at the network device component 109. Operation 1005 is executed to receive component function call results. Operation 1006 is executed to return the function call results to the management agent 106. Operation 1007 is executed to map function call results to the management response, where a management response may be an outstanding function call in need of being resolved. Operation 1008 is executed to transmit a network device response in the form of network device response 317.

FIG. 11 shows a diagrammatic representation of a machine in the example form of a computer system 1100 within which a set of instructions, for causing the machine to perform any one or more of the methodologies discussed herein, may be executed. In alternative example embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a Central Processing Unit (CPU), a Graphics Processing Unit (GPU) or both), a main memory 1101, and a static memory 1106, which communicate with each other via a bus 1108. The computer system 1100 may further include a video display unit 1110 (e.g., a Liquid Crystal Display (LCD) or a Cathod Ray Tube (CRT)). The computer system 1100 also includes an alpha-numeric input device 1117 (e.g., a keyboard), a User Interface (UI) cursor controller 1111 (e.g., a mouse), a disk drive unit 1116, a signal generation device 1118 (e.g., a speaker) and a network interface device (e.g., a transmitter) 1120.

The disk drive unit 1116 includes a machine-readable medium 1122 on which is stored one or more sets of instructions and data structures (e.g., software) 1121 embodying or utilized by any one or more of the methodologies or functions illustrated herein. The instructions 1121 may also reside, completely or at least partially, within the main memory 1101 and/or within the processor 1102 during execution thereof by the computer system 1100, with the main memory 1101 and the processor 1102 also constituting machine-readable media.

The instructions 1121 may further be transmitted or received over a network 1126 via the network interface device 1120 using any one of a number of well-known transfer protocols (e.g., Hyper-Text Transfer Protocol (HTTP)).

While the machine-readable medium 1122 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories and optical and magnetic media.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the system and method should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   implementing on a network device, as part of a managed resource instrumentation application to instrument a managed network device component, a common application programming interface (API) that is generated from an interface that defines components of the managed resource instrumentation application independent from any particular management agent;
   compiling the interface into a component skeleton of a feature associated with the network device component;
   binding a first function of a first management agent of two or more management agents with a common function of the common API;
   binding a second function of a second management agent of the two or more management agents with the common function of the common API;
   accessing the component skeleton of the feature associated with the network device component by the first agent and by the second agent via the common function of the common API,
   wherein the two or more management agents process network management instructions written in different network management instruction protocols.

2. The method of claim 1, wherein the common API includes a function, the binding of the two or more management agents with the API comprising mapping each of the two or more management agents to the function included in the common API.

3. The method of claim 1, further comprising compiling the interface into another component skeleton of another feature of the network device, and binding respective further functions of the two or more management agents with a corresponding function of the common API.

4. The method of claim 1, wherein the different network management instruction protocols processed by the two or more management agents include two or more of: Simple Network Management Protocol (SNMP), Netconf, and Internetwork Operating System Command Line Interface (IOS-CLI).

5. The method of claim 1, wherein the common API is a set of functions provided to support requests made by a software application.

6. A system comprising:
   a network device comprising two or more management agents to process network management instructions written in different network management protocols;
   a common application programming interface (API) that forms part of a managed resource instrumentation application to instrument a managed component of the network device;
   a generator to generate the common API from an interface that defines components of the managed resource instrumentation application independently from any particular management agent;
   a compiler to compile the interface into a component skeleton of a feature associated with the network device;
   a function mapping engine to bind the two or more management agents with the common API, wherein the function mapping engine:
      binds a first function of a first management agent of the two or more management agents with a common function of the common API; and binds a second function of a second management agent of the two or more management agents with the common function of the common API;

an API calling engine to access the component skeleton of the feature associated with the network device by the first management agent and by the second management agent via the common function of the common API responsive to receipt by the two or more management agents of respective network management instructions in the different network management instruction protocols.

7. The system of claim 6, wherein the generator is located on the network device.

8. The system of claim 6, wherein the common API includes a function, and wherein the function mapping engine maps each of the two or more management agents to the function included in the common API.

9. The system of claim 6, wherein the compiler compiles the interface into another component skeleton of another feature of the network device, and wherein the function mapping engine binds respective further functions of the two or more management agents with a corresponding function of the common API.

10. The system of claim 6, wherein the component skeleton is in a computer language different from that of the interface.

11. The system of claim 6, wherein the different network management instruction protocols processed by the two or more management agents include two or more of: Simple Network Management Protocol (SNMP), Netconf, and Internetwork Operating System Command Line Interface (IOS-CLI).

12. The system of claim 6, wherein each of the two or more management agents is an application to process a network management instruction that requests information relating to a feature of the network device.

13. A non-transitory machine-readable storage medium storing instructions which, when performed by a machine, cause the machine to:

generate a common application programming interface (API) as part of a managed resource instrumentation application to instrument a managed network device component from an interface that defines components of the managed resource instrumentation application independent from any particular management agent;

compile the interface into a component skeleton of a feature associated with the network device component;

bind a first function of a first management agent of two or more management agents with a common function of the common API;

bind a second function of a second management agent of the two or more management agents with the common function of the common API;

access the component skeleton of the feature associated with the network device component by the first management agent and by the second management agent via the common function of the common API, wherein the two or more management agents process network management instructions written in different network management instruction protocols.

14. The non-transitory machine-readable storage medium of claim 13, wherein the common API includes a function, the binding of the two or more management agents with the common API comprising mapping each of the two or more management agents to the function included in the common API.

15. The non-transitory machine-readable storage medium of claim 13, wherein the instructions further cause the machine to compile the interface into another component skeleton of another feature of the network device, and to bind respective further functions of the two or more management agents with a corresponding function of the common API.

16. The non-transitory machine-readable storage medium of claim 13, wherein the different network management instruction protocols processed by the two or more management agents include two or more of: Simple Network Management Protocol (SNMP), Netconf, and Internetwork Operating System Command Line Interface (IOS-CLI).

17. The non-transitory machine-readable storage medium of claim 13, wherein the common API is a set of functions provided to support requests made by a software application.

* * * * *